US006958860B2

(12) United States Patent
Dontula et al.

(10) Patent No.: US 6,958,860 B2
(45) Date of Patent: Oct. 25, 2005

(54) VOIDED POLYMER FILM CONTAINING LAYERED PARTICULATES

(75) Inventors: Narasimharao Dontula, Rochester, NY (US); Debasis Majumdar, Rochester, NY (US); Robert P. Bourdelais, Pittsford, NY (US); Cheryl J. Kaminsky, Rochester, NY (US); Michael R. Brickey, Rochester, NY (US); Thomas M. Laney, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 61 days.

(21) Appl. No.: 10/266,176

(22) Filed: Oct. 7, 2002

(65) Prior Publication Data

US 2004/0066556 A1 Apr. 8, 2004

(51) Int. Cl.[7] .................................................. G02B 5/02

(52) U.S. Cl. ........................ 359/599; 359/518; 359/534

(58) Field of Search ................................. 359/599, 518, 359/534–540; 428/34, 195, 200–207; 158/230, 240–247, 264

(56) References Cited

U.S. PATENT DOCUMENTS

| | | | | |
|---|---|---|---|---|
| 4,055,377 A | * 10/1977 | Erickson et al. | ............ | 359/518 |
| 5,571,362 A | * 11/1996 | Hachey et al. | .............. | 156/264 |
| 5,910,858 A | * 6/1999 | Frey et al. | .................. | 359/534 |
| 6,726,982 B2 | * 4/2004 | Christian et al. | ........... | 156/230 |
| 6,735,789 B2 | * 5/2004 | Kelleher et al. | ............... | 2/458 |

* cited by examiner

*Primary Examiner*—Mohammad Sikder
(74) *Attorney, Agent, or Firm*—Arthur E. Kluegel

(57) ABSTRACT

Disclosed is an optical element comprising a polymer film containing a dispersion of minute layered particulates and microvoids.

51 Claims, 7 Drawing Sheets

VOIDED POLYMER FILM CONTAINING LAYERED PARTICULATES

CROSS REFERENCE TO RELATED APPLICATIONS

This application is one of a group of five related commonly assigned applications co-filed herewith under application Ser. Nos. 10/265,974; 10/266,176; 10/265,982; 10/266,181; and 10/265,552, the contents of which are incorporated herein by reference.

FIELD OF THE INVENTION

The invention relates to an optical light diffusing element containing smectite particulates. In a preferred form, the invention relates to an optical element to manage illumination light for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need for a separate film. In the case of light management in a LCD, this increases efficiency by removing an interface (which causes reflection and lost light).

In U.S. Pat. No. 6,270,697 (Meyers et al.), blur films are used to transmit infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. The materials disclosed in U.S. Pat. No. 6,266,476 shape and collimate light, and therefore are not efficient diffusers of light particularly for liquid crystal display devices.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

U.S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptably reduce the brightness of the LC device.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

Recently, nanocomposite particulates prepared using smectite clays have received considerable interest from industrial sectors, such as the automotive industry and the packaging industry, for their unique physical properties. These properties include improved heat distortion characteristics, barrier properties, and mechanical properties. The related prior art is illustrated in U.S. Pat. Nos. 4,739,007; 4,810,734; 4,894,411; 5,102,948; 5,164,440; 5,164,460; 5,248,720, 5,854,326, 6,034,163. However, the use of these nanocomposites in imaging materials for stiffer and thinner support has not been recognized in the aforementioned patents.

In order to obtain stiffer polymeric supports using smectite clays, the clays need to be intercalated or exfoliated in the polymer matrix. There has been a considerable effort put towards developing methods to intercalate the smectite clays and then compatibilize with thermoplastic polymer. This is because the clay host lattice is hydrophilic, and it must be chemically modified to make the platelet surfaces organophilic in order to allow it to be incorporated in the polymer. To obtain the desired polymer property enhancements, all the intercalation techniques developed so far are batch processes, time consuming and lead to increasing the overall product cost.

There are two major intercalation approaches that are generally used—intercalation of a suitable monomer followed by polymerization (known as in-situ polymerization, see A. Okada et. Al., *Polym Prep*. Vol. 28, 447, 1987) or monomer/polymer intercalation from solution. Polyvinyl alcohol (PVA), polyvinylpyrrolidone (PVP) and polyethylene oxide (PEO) have been used to intercalate the clay platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorrilonite", *Journal of Colloid Science*, Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered particulates. In a recent work by Richard Vaia et. al., "New Polymer Electrolyte Nanocomposites: Melt intercalation of polyethyleneoxide in mica type silicates", *Adv. Materials,* 7(2), 154–156, 1995, PEO was intercalated into Na-montmorillonite and Li-montmorillonite by heating to 80° C. for 2–6 hours to achieve a d-spacing of 17.7 Å. The extent of intercalation observed was identical to that obtained from solution (V. Mehrotra, E. P. Giannelis, *Solid State Commun.,* 77, 155, 1991). Other, recent work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalant monomer that contains an amine or amide functionality or mixtures thereof. In both these patents and other patents issued to the same group the intercalation is performed at very dilute clay concentrations in an intercalant carrier like water. This leads to a necessary and costly drying step, prior to intercalates being dispersed in a polymer. Disclosed in WO 93/04118 is the intercalation process based on adsorption of a silane coupling agent or an onium cation such as a quaternary ammonium compound having a reactive group that is compatible with the matrix polymer.

There are difficulties in intercalating and dispersing smectite clays in thermoplastic polymers. This invention provides a technique to overcome this problem. It also provides an article with improved dispersion of smectite clays that can be incorporated in a web. Prior art optical elements which include light diffusers, light directors, light guides, brightness enhancement films and polarizing films typical comprise a repeating ordered geometrical pattern or random geometrical pattern. The geometrical patterns typically have a single size distribution in order to accomplish the intended optical function. An example is a brightness enhancement film for LC displays utilizing precise micro prisms. The micro prism geometry has a single size distribution across the sheet and when utilized with a polarizing sheet, the top of the micro prisms are in contact with the polarizing sheet. When these prior art optical elements are used as a system, as is the case in a liquid crystal display, the optical elements are typically in optical contact. The focal length of the prior art optical elements, in combination with other optical elements, typically comprise the thickness of the optical element.

PROBLEM TO BE SOLVED BY THE INVENTION

There remains a need for an improved light diffusion of image illumination light sources to provide improved diffuse light transmission while simultaneously diffusing specular light sources.

SUMMARY OF THE INVENTION

The invention provides an optical element comprising a polymer film containing a dispersion of minute layered particulates and microvoids. The invention also provides a light diffuser for rear projection displays, back-lighted imaging media, a liquid crystal display component and device, and a method for forming a voided polymer support containing layered particulates.

ADVANTAGEOUS EFFECT OF THE INVENTION

The invention provides improved light transmission while simultaneously diffusing visible light sources such as fluorescent or LED light utilized in LCD backlights.

DETAILED DESCRIPTION OF THE INVENTION

Figure 1:
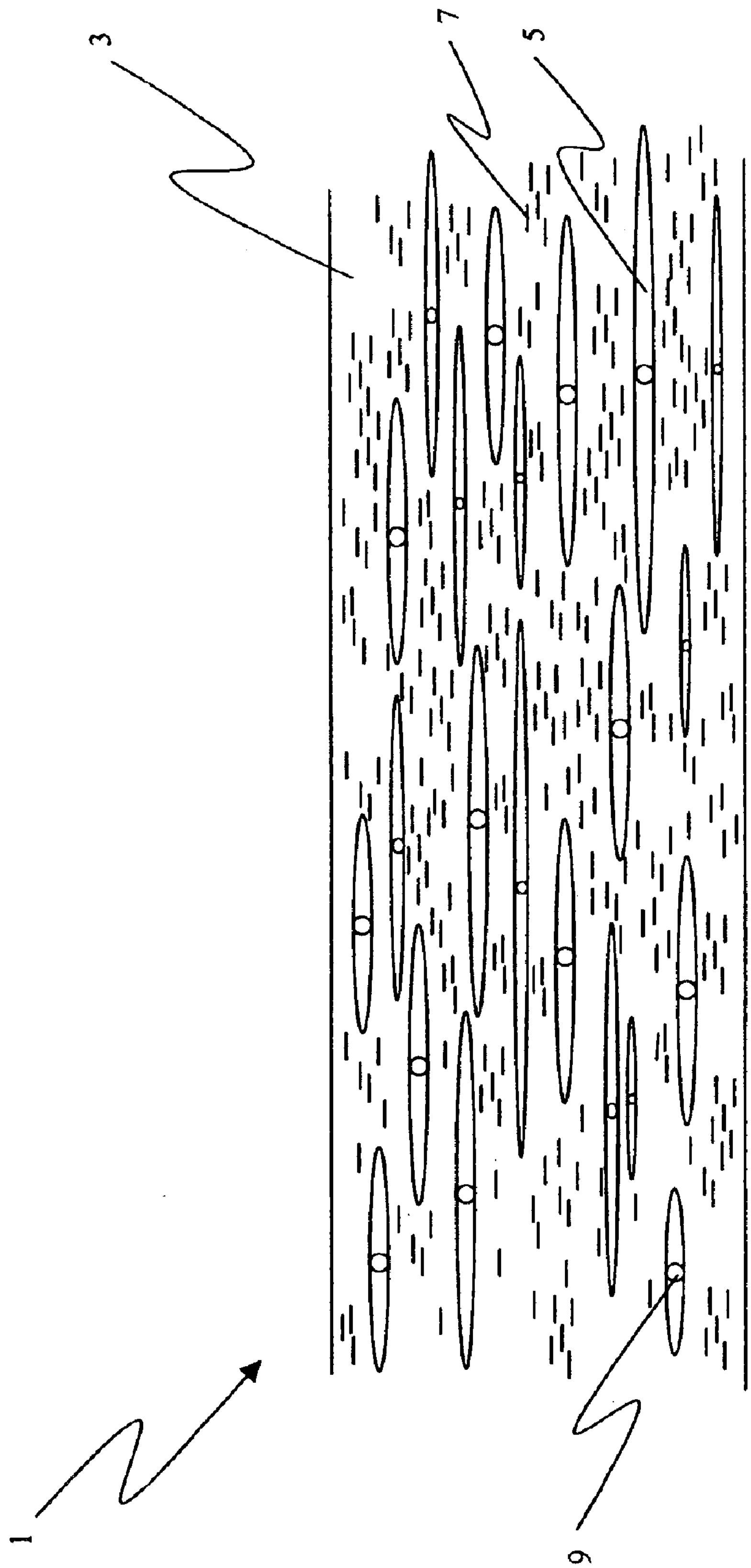
FIG. 1, is a schematic of an optical element where layered particulates are located in a layer containing microvoids.

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The present invention is an article, which uses layered particulates such as smectite clay, preferably intercalated with an organic material having a hydrophilic component, and more preferably an additional oleophilic component. The aforesaid organic material can comprise a surfactant, an ethoxylated alocohol and/or a block co-polymer. The intercalated clay creates several index of refraction changes which in combination with a voided polymer sheet efficiently diffuse visible light. The addition of the nano-composite material to a voided polymer sheet improves the mechanical strength of the polymer element thereby increasing the scratch resistance of the sheet and improving the stiffness of the sheet allowing thinner, lower weight materials to be used. Thinner, lower weight materials reduce the weight and size of display devices allowing devices to be made smaller and lighter in weight. The intercalated clay materials useful in the invention also improves the thermal properties of the base polymer making the invention materials more thermally and optically stable at temperatures encountered in a hot car or in a military vehicle such as a tank. Thermal and optical stability increases the environmental range in which display devices can be utilized.

The voided polymer layer useful in the invention can be easily changed to achieve the desired diffusion and light transmission requirements for many liquid crystal devices thus allowing the invention materials to be responsive to the rapidly changing product requirements in the liquid crystal display market.

The invention reduces the need for an air gap between prior art light diffusers that contain a rough surface and the brightness enhancement films used in liquid crystal display devices. Because the lenses can be applied on one side of the voided polymer base, an additional skin layer is provided to eliminate the need for an air gap between the brightness enhancement film and the light diffuser. The elimination of the air gap allows for the diffuser materials to be adhesively bonded to other film components in the liquid crystal display making the unit lighter in weight and lower in cost. Further, combining air voided polymer diffusion surfaces in the bulk of the base and lenses on the surface, the diffuser can be used to both shape and diffuse the light as the geometry of the air voids and the lenses can differ to perform separate light diffusion tasks. For example, the air voided polymer could perform large scale diffusion and the lenses can diffuse with a smaller cone angle which would result in a light diffuser with a high % light diffusion and a small diffusion cone angle.

The voided polymer layer useful in the invention has a higher resistance to heat flow because of the addition of the layered particulates and therefore can be used in extreme ambient environmental conditions or better withstand hot light sources contained in portable LC devices for example. The invention materials do not contain inorganic particles typical for prior art voided polymer films that cause unwanted scattering of the back light source and reduce the transmission efficiency of the liquid crystal display device. Further, the elastic modulus and scratch resistance of the diffuser is improved over prior art cast coated polymer diffusers rendering a more robust diffuser during the assembly operation of the liquid crystal device. These and other advantages will be apparent from the detailed description below.

"Minute" particulate particulates means an inorganic phase, such as a smectite clay, where at least one dimension of the particle, typically the layer thickness, is in the range of 0.1 to 100 nm on a numerical average basis. "Basal plane" means the (001) plane of the layered material as commonly defined in x-ray crystallography and "basal plane spacing"

means the interlayer distance between nearest equivalent basal planes, on a numerical average basis.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y plane. The term "pattern" means any predetermined arrangement of lenses whether regular or random.

Better control and management of the back light are driving technological advances for liquid crystal displays (LCD). LCD screens and other electronic soft display media are back-lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, microvoided polymer film, or coating the film with matte resins or beads. The role of the front diffuser is to broaden the light coming out of the liquid crystal (LC) with directional selectivity. The light is compressed into a tight beam to enter the LC for highest efficiency and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets which the minor lenses are formed randomly on top of. "Minor lenses" mean lenses smaller than the major lenses that are formed on the major lenses. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

The term "polymer" means homo- and co-polymers. The term microbead means polymeric spheres typically synthesized using the limited coalescence process. These microbead spheres can range in size from 0.2 to 30 micrometers. They are preferably in the range of 0.5 to 5.0 micrometers. The term microvoids means pores formed in an oriented polymeric film during stretching. These pores are initiated by either inorganic particles, organic particles, or microbeads. The size of these voids is determined by the size of the particle or microbeads used to initiate the void and by the stretch ratio used to stretch the oriented polymeric film. The pores can range from 0.6 to 150 $\mu$m's in machine and cross machine directions of the film. They can range from 0.2 to 30 micrometers in height. Preferably the machine and cross machine direction pore size is in the range of 1.5 to 25 micrometers. Preferably the height of the pores is in the range of 0.5 to 5.0 micrometers. The term substantially circular means indicates a geometrical shape where the major axis is no more than two times the minor axis.

"Nanocomposite" shall mean a composite material wherein at least one component comprises an inorganic phase, such as a smectite clay, with at least one dimension in the 0.1 to 100 nanometer range. "Plates" shall mean particles with two dimensions of the same size scale and is significantly greater than the third dimension. Here, length and width of the particle are of comparable size but orders of magnitude greater than the thickness of the particle.

"Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5–line 23, col. 7).

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. There are at least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

In order to provide an optical element that efficiently diffuses light in the bulk of the sheet an optical element comprising a polymer film containing a dispersion of minute layered particulates and microvoids is preferred. The voided layer provides light diffusion by allowing visible transmitted light to change direction as the transmitted light encounters the curved surface and index of refraction change from an air void. The layered materials in a layer adjacent to the voided layer, in the voided layer or in both a layer adjacent the voided layer and in the voided layer provides for several index of refraction changes further increasing the haze of the optical element. Further, the addition of the layered materials has been shown to improve the thermal properties of the polymer binder rendering the optical element more resistant to temperature and temperature changes. The addition of the layered materials useful in the invention also provides an improvement in the mechanical properties of an oriented polymer sheet, increasing mechanical modulus as much as 18% with a scant 2% addition by weight of the layered materials.

The addition of the layered materials into a voided layer has also been shown to improve the mechanical properties of the voided layer providing a 5 to 20% improvement in the mechanical resistance to bending and compression forces. The layered materials reinforce the binder network in the voided layer providing bending and compression resistance. The layered materials addition to the voided layer also improves the heat resistance of the voided layer allowing the voided layer useful in the invention better withstand the heat generated by the backlights and ambient heat encountered during the lifetime of a display particularly displays that have military application such as those in aircraft, tanks or battleships.

Preferably, the optical element comprises an olefin repeating unit. Polyolefins are low in cost and high in light transmission. Further, polyolefin polymers are efficiently melt extrudable and therefore can be used to create light diffusers in roll form.

In another embodiment of the invention, the optical element comprises a carbonate repeating unit. Polycarbonates have high optical transmission values that allows for high light transmission and diffusion. High light transmission provides for a brighter LC device than diffusion materials that have low light transmission values. Polycarbonate also has a higher index of refraction than olefins and polyester, increasing the light spreading compared to olefins and polyesters.

In another embodiment of the invention, the optical element comprises an ester repeating unit. Polyesters are low in cost and have good strength and surface properties. Further, polyester polymer is dimensionally stable at temperatures between 80 and 200 degrees C. and therefore can withstand the heat generated by display light sources.

The preferred diffuse light transmission of the diffuser material useful in the invention is greater than 50%. Diffuser light transmission less than 45% does not let a sufficient quantity of light pass through the diffuser, thus making the diffuser inefficient. A more preferred diffuse light transmission of the lenslet film is at least 80 typically from 80 to 95%. An 80% diffuse transmission allows an LC device to have improved battery life and increased screen brightness. The most preferred diffuse transmission of the transparent polymeric film is at least 92%. A diffuse transmission of 92% allows diffusion of the back light-source and maximizes the brightness of the LC device significant improving the image quality of an LC device for outdoor use where the LC screen must compete with natural sunlight.

The minute particles or layer thickness useful in the invention have a dimension in the range of from 0.1 to 100 nm. and typically from 0.5 to 10 nm. The average basal plane separation is desirably in the range of from 0.5 to 10 nm, preferably in the range of from 1 to 9 nm, and typically in the range of from 2 to 5 nm.

The optical element of the invention preferably has particulate layered materials with an aspect ratio between 10:1 and 1000:1. The aspect ratio of the layered material, defined as the ratio between the lateral dimension (i.e., length or width) and the thickness of the particle, is an important factor in the amount of light diffusion. An aspect ratio much less than 8:1 does not provide enough light diffusion. An aspect ratio much greater than 1000:1 is difficult to process.

The layered materials are preferably present in an amount between 1 and 10% by weight of the binder. Layered materials present in an amount less than 0.9% by weight of the binder have been shown to provide very low levels of light diffusion. Layered materials in an amount over 11% have been shown to provide little increase in light diffusion while adding unwanted color to the binder, coloring transmitted light. Layered materials that are present in an amount between 1.5% and 5% by weight of the binder are most preferred as the visible light diffusion is high while avoiding unwanted coloration and additional expense of additional materials. Further, layered materials present in the amount from 1.5% to 5% have been shown to provide excellent light diffusion for specular backlight assemblies such as those found in liquid crystal displays.

In another preferred embodiment of the invention, the layered materials are present in an amount between 0.1 and 1% by weight of said binder. By providing the layered materials between 0.1 and 1% by weight an optical element with a high light transmission (greater than 90%) and a low haze (less than 10%) results allowing the optical element to be used an external light diffuser with anti-glare properties. An anti-glare optical element reduces the glare created by ambient light such as sunlight which causes the quality of the transmission image to be reduced.

In another preferred embodiment of the invention, the optical element comprises two or more layers. By providing additional layers, to the optical element, improvements to the optical element such as anti-static properties, and light filtering properties can be accomplished in the additional layers. By providing a multiple layered optical element, the layered materials useful in the invention can be added to a specific location to control the focal length of the diffused light. It has been shown that by adding the layered materials useful in the invention to different layers in the optical element, the light intensity as a function of viewing angle can be changed thus allowing the invention materials to be customized to optimize an optical system. For example 2% weight addition of the layered materials useful in the invention can be incorporated in an outermost layer of a 125 micrometer optical element. If the outermost layer containing the layered materials is oriented toward a light source the diffuse light intensity as a function of angle will be small at the normal compared to the case were the outermost layer is oriented away from the light source. The optical element preferably can have several layers containing different weight % addition of the layered materials useful in the invention to create a light diffusion gradient in the direction of the light travel.

The thickness of the transparent polymeric film preferably is not more than 250 micrometers or more preferably from 12.5 to 50 micrometers. Current design trends for LC devices are toward lighter and thinner devices. By reducing the thickness of the light diffuser to not more than 250 micrometers, the LC devices can be made lighter and thinner. Further, by reducing the thickness of the light diffuser, brightness of the LC device can be improved by reducing light transmission. The more preferred thickness of the light diffuser is from 12.5 to 50 micrometers which further allows the light diffuser to be convienently combined with a other optical materials in an LC device such as brightness enhancement films. Further, by reducing the thickness of the light diffuser, the materials content of the diffuser is reduced.

The invention provides a film that scatters the incident light uniformly. The oriented film of the present invention can be produced by using a conventional film-manufacturing facility in high productivity. The invention utilizes a voided thermal plastic layer containing microvoids. Microvoids of air in a polymer matrix are preferred and have been shown to be a very efficient diffuser of light compared to prior art diffuser materials which rely on surface roughness on a polymer sheet to create light diffusion for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduces thus extending the life of a battery. The preferred diffuse light transmission of the diffuser material useful in the invention are greater than 65%. Diffuser light transmission less than 60% does not let a sufficient quantity of light pass through the diffuser, thus making the diffuser inefficient. A more preferred diffuse light transmission of the microvoided thermoplastic voided layer is greater than 80%. An 80% diffuse transmission allows the LC device to improve battery life and increase screen brightness. The most preferred diffuse transmission of the voided thermoplastic layer is greater than 87%. A diffuse transmission of 87% allows diffusion of the back light source and maximizes the brightness of the LC device significant improving the image quality of an LC device for outdoor use where the LC screen must compete with natural sunlight.

Since the microvoids useful in the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

Since the optical element of the invention typically is used in combination with other optical web materials, a light diffuser with an elastic modulus greater than 800 MPa is preferred. An elastic modulus greater than 800 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble. A light diffuser with an impact resistance greater than 0.9 GPa is preferred. An impact resistance greater than 0.9 GPa allows the light diffuser to resist scratching and mechanical deformation that can cause unwanted uneven diffusion of the light causing "hot" spots in an LC device.

The thickness uniformity of the light diffuser across the diffuser is preferably less than 0.10 micrometers. Thickness uniformity is defined as the diffuser thickness difference between the maximum diffuser thickness and the minimum diffuser thickness. By orienting the light diffuser useful in the invention, the thickness uniformity of the diffuser is less than 0.10 micrometers, allowing for a more uniform diffusion of light across the LC device compared to cast coated diffuser. As the LC market moves to larger sizes (40 cm diagonal or greater), the uniformity of the light diffusion becomes an important image quality parameter. By providing a voided light diffuser with thickness uniformity less than 0.10 micrometers across the diffusion web, the quality of image is maintained.

For light diffuser useful in the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. The light diffuser film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer.

The thermoplastic diffuser of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers, followed by biaxial orientation, whereby voids are formed around void-initiating material contained in the thin layers.

Polyester microvoided light diffusers are also preferred as oriented polyester has excellent strength, impact resistance and chemical resistance. The polyester utilized in the invention should have a glass transition temperature between about 50.degree. C. and about 150.degree. C., preferably about 60–100.degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to the microvoided polyester diffusion sheet which may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

Addenda is preferably added to a polyester skin layer to change the color of the imaging element. Colored pigments that can resist extrusion temperatures greater than 320.degree. C. are preferred as temperatures greater than 320.degree. C. are necessary for co-extrusion of the skin layer.

An addenda of this invention that could be added is an optical brightener. An optical brightener is substantially colorless, fluorescent, organic compound that absorbs ultraviolet light and emits it as visible blue light. Examples include but are not limited to derivatives of 4,4'- diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The polyester diffuser sheets may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The optical element of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss. The tacky adhesive is preferably those having a refractive index close to that of the oriented film to suppress the interfacial reflection loss of light.

The optical element of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The optical element of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The micro void-containing oriented film of the present invention usually has optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence Δn which is a difference between the refractive index in the slow optic axis direction and the refractive index in the fast optic axis direction in the plane of the film, i.e. Δn*d (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn.*d since the level depends upon the application of the film, however, it is preferably 50 nm or more.

The microvoid-containing oriented film of the present invention has a function to diffuse the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission. "Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape which is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Microvoids formed from organic spheres are preferred because they are low in light scattering, have been shown to form substantially circular voids and are easily dispersed in polyester. Further, the size and the shape of the voided diffuser layer can be changed by proper selection of organic sphere size and amount. Microvoids that are substantially free of scattering inorganic particles is also preferred. Prior art voided polymer layers that use inorganic particles such as clay, $TiO_2$ and silica have been shown to unacceptably scatter visible light energy. Scattering light energy from the back light source reduces the efficiency of the display unit by scattering light energy away from the LC and back toward the light source. It has been shown that inorganic micro-voiding particles can cause as much as 8% loss in transmitted light energy.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void in the polymer layer of the diffuser that has a volume less than 100 cubic micrometers. Microvoids larger than 100 cubic micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

The organic void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)═$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$═C(R')C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$═CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Preferred crosslinked polymer beads have a mean particle size less than 2.0 micrometers, more preferably between 0.3 and 1.7 micrometers. Crosslinked polymer beads smaller than 0.3 micrometers are prohibitively expensive. Crosslinked polymer beads larger than 1.7 micrometers make voids that large and do not scatter light efficiently. Suitable cross-linked polymers for the microbeads used in void formation during sheet formation are polymerizable organic materials which are members selected from the group consisting of an alkenyl aromatic compound having the general formula

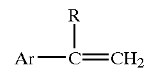

wherein Ar represents an aromatic hydrocarbon radical, or an aromatic halohydrocarbon radical of the benzene series and R is hydrogen or the methyl radical; acrylate-type monomers including monomers of the formula

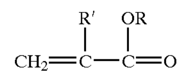

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

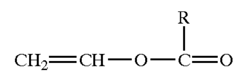

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein n is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinyl-benzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl and toluene. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization and limited coalescence directly yield very uniformly sized particles. U.S. Pat. No. 6,074,788, the disclosure of which is incorporated for reference. It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

The microbeads of cross-linked polymer range in size from 0.1–50 μm, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads. The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of films to the uniaxial orientation of microvoided films. Balanced microvoids are largely circular in the plane of orientation. The size of the microvoids and the ultimate physical properties depend upon the degree and balance of the orientation, temperature and rate of stretching, crystallization kinetics, and the size distribution of the microbeads. The film supports according to this invention are prepared by: (a) forming a mixture of molten continuous matrix polymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, resulting in a mechanical anticompatibilization process.

In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

In another embodiment of the invention, the thermoplastic diffusion layer of the invention is preferably formed from a polymer foam process. The polymer foam process allows for the formation of air voids in a polymer matrix providing a index of refraction difference between the air voids and the polymer matrix of greater than 0.2. Since the polymer air forming process creates air voids without the use of a voiding agent, no light energy scattering has been observed. The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process. The addition of the layered particulates to the polymer foam matrix has been shown to increase strength of the foam voided layer, provides an improvement in resistance to high temperatures and a resistance to bending compared to foam polymer without layered particulates.

In a preferred embodiment of this invention polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis (benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide, though others can also be used. If necessary, these foaming agents may be used together with an auxiliary foaming agent, nucleating agent, and a cross-linking agent.

The binder useful in the invention preferably comprises polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens useful in the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda are preferably added to a polyester skin layer to change the color of the imaging element. An addendum of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of the invention is the efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The optical element may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The optical element of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss. The tacky adhesive is preferably those having a refractive index close to that of the oriented film to suppress the interfacial reflection loss of light.

The layered materials suitable for this invention can comprise any inorganic phase desirably comprising layered materials in the shape of plates with significantly high aspect ratio. However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic polymers, are the layered double hydroxides or hydrotalcites, such as Mg6A13.4(OH)18.8(CO3)1.7H2O, which have positively charged layers and exchangeable anions in the interlayer spaces. Other layered materials having little or no charge on the layers may be useful provided they can be intercalated with swelling agents, which expand their interlayer spacing. Such materials include chlorides such as FeCl3, FeOCl, chalcogenides, such as TiS2, MoS2, and MoS3, cyanides such as Ni(CN)2 and oxides such as H2Si2O5, V6O13, HTiNbO5, Cr0.5V0.5S2, V2O5, Ag doped V2O5, W0.2V2.8O7, Cr3O8, MoO3(OH)2, VOPO4-2H2O, CaPO4CH3-H2O, MnHAsO4-H2O, and Ag6 Mo10O33. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred smectite clays include montmorillonite, hectorite and hydrotalcites, because of commercial availability of these materials.

The aforementioned particles can be natural or synthetic such as smectite clay. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the particles should have a lateral dimension of between 0.01 μm and 5 μm, and preferably between 0.05 μm and 2 μm, and more preferably between 0.1 μm and 1 μM. The thickness or the vertical dimension of the particles can vary between 0.5 nm and 10 nm, and preferably between 1 nm and 5 nm. The aspect ratio, which is the ratio of the largest and smallest dimension of the particles should be between 10:1 and 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects due to deleterious light scattering, and can be abrasive to processing, conveyance and finishing equipment as well as to other components.

The concentration of particles in the optical component of the invention can vary as per need; however, it is preferred to be <10% by weight of the binder. Significantly higher amounts of clay can impair physical properties of the optical component by rendering it brittle, as well as difficult to process. On the other hand, too low a concentration of clay may fail to achieve the desired optical effect. It is preferred that the clay concentration be maintained between 1 and 10% and more preferred to be between 1.5 and 5% for optimum results.

The particle materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The preferred clay materials generally include interlayer or exchangeable cations such as Na+, Ca+2, K+, and Mg+2. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the particles are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10 and more preferably between 20:80 and 80:20.

The swelling agent or intercalant can be an organic material preferably comprising a hydrophilic component, and more preferably also comprising an oleophilic component. It is believed that the hydrophilic component participates in intercalation and the oleophilic component participates in compatibilization of the smectite clay in a suitable matrix or binder polymer. The aforesaid organic material can comprise a surfactant, a block co-polymer and/or an ethoxylated alocohol. In a most preferred embodiment, the aforesaid organic material is a block copolymer or an ethoxylated alcohol, similar to those disclosed in Ser. Nos. 10/008,428; 10/008,810 and 10/011,0407, incorporated herein by reference.

The preferred block copolymers useful in the invention are amphiphilic and have a hydrophilic and an oleophilic component. Further, the block copolymers useful in the invention can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides) such as poly(ethylene oxide). The term poly(alkylene oxides) as used herein includes polymers derived from alkylene oxides such as poly(ethylene oxides) including mixtures of ethylene and propylene oxides. The most preferred is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly (ethylene oxides) including mixtures of ethylene and propylene oxides. The most preferred is poly(ethylene oxide), mainly because of its effectiveness in the present invention, its commercial availability in a range of molecular weights and chemistries affording a wide latitude in the synthesis of the block copolymers.

Poly(ethylene oxides) are well known in the art and are described in, for example U.S. Pat. No. 3,312,753 at column 4. Useful (alkylene oxide) block contains a series of interconnected ethyleneoxy units and can be represented by the formula:

$$[CH2\text{-}CH2\text{-}O]_n$$

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly (vinylpyrrolidone), poly(vinyl alcohol), polyacrylamides, polyacrylonitrile, polysaccharides and dextrans.

The oleophilic component of the block of the polymers useful in the present invention can also be selected from many common components. The oleophilic component is characterized in that it is at least partially miscible in the binder polymer useful in the invention, and/or interacts with the binder polymer, for example, through transesterfication. In the case of a polyester binder, the oleophilic block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; derivatives of lysine; and derivatives of glutamic acid.

Other useful oleophilic components can be derived from α,β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid;

polyglycolic acid; polyhydroxybutyric acid; derivatives of polylysine; and derivatives of polyglutamic acid, polyolefins, polystyrene, polyacrylates, and polymers of $\alpha,\beta$-ethylenically unsaturated monomers, such as olefins, styrenics and acrylates. Preferred components comprise polyester, polycaprolactone, polyamide, and polystyrene, because of their effectiveness in the present invention and compatibility with a wide rage of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A preferred matrix compatible block comprises 50 to 500 monomer repeat units of caprolactone with a matrix polymer of polyester. Another preferred matrix compatible block comprises 25 to 100 monomer repeat units of ethylene with a matrix polymer of polyethylene. The preferred molecular weight ranges are chosen to ensure ease of synthesis and processing under a variety of conditions.

Ethoxylated alcohols, another preferred class of intercalants, are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26–50 carbon range.

The relative efficiency of the hydrophilic and oleophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10–90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be reduced after dispersion.

The smectite clay and the intercalant, preferably the block copolymer and/or the ethoxylated alcohol, useful in the invention can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying. Of the aforesaid methods, the one involving melt blending is preferred, for ease of processing.

In a preferred embodiment of the invention the clay, together with any optional addenda, is melt blended with the intercalant useful in the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner and Pfleiderrer, and Berstorff which can be operated either in the co-rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the block copolymer is through the use of the side stuffer, to ensure intercalation of the clay through proper viscous mixing and to ensure dispersion of the filler through the polymeric phase as well as to control the thermal history of the additives. In this mode, the intercalant is fed using the main resin feeder, and is followed by the addition of clay through the downstream side stuffer. Alternatively, the clay and the intercalant can be fed using the main feeders at the same location.

In yet another embodiment of the invention, the clay, the intercalant and the matrix or binder polymer together with any optional addenda are melt blended in a suitable twin screw compounder. One of the preferred modes of addition of clay and the intercalant to the polymer is by the use of side stuffers to ensure intercalation of the clay through proper viscous mixing; the intercalant first followed by the addition of clay through the downstream side stuffer or vice versa. The mode of addition will be determined by characteristics of the intercalant. Alternatively, the clay and the intercalant are premixed and fed through a single side stuffer This method is particularly suitable if there is only one side stuffer port available, and also there are limitations on the screw design. Also preferred are methods where the clay and intercalant are fed using the main feeders at the same location as the binder resin.

In another preferred embodiment of the invention, the clay, together with any optional addenda, is melt blended with the intercalant useful in the invention using any suitable mixing device such as a single screw compounder, blender, mixer, spatula, press, extruder, or molder.

In the formation of an article comprising the intercalated clay useful in the invention, any method known in the art including those mentioned herein above can be utilized. The end product of the instant invention, comprising the clay, the intercalant and the binder polymer together with any optional addenda, can be formed by any suitable method such as, extrusion, co-extrusion with or without orientation by uniaxial or biaxial, simultaneous or consecutive stretching, blow molding, injection molding, lamination, solvent casting, coating, drawing, spinning, or calendaring.

The optical element of the invention may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The optical element of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The optical element of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The optical element of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or a metal oxide or a filler.

In the manufacturing process for this invention, preferred lens polymers are melt extruded from a slit die. In general, a T die or a coat hanger die is preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

Surface features added to the voided polymer sheet containing layered materials are preferred because they further increase the optical utility such as light direction, light guiding or light focusing. In preferred embodiment of the invention, the surface features are on both the top and bottom of the optical element. By providing surface features on the top and bottom of the optical element, several different optical functions can be preformed utilizing one sheet. For example, the top side of the optical element could contain a prism structure while the bottom side contains a diffuser feature allowing the film to both direct and diffuse transmitted light energy.

In a more preferred form, the optical element of the invention has a surface roughness between 5 and 50 micrometers. This range has been shown to accomplish many significant optical functions such as light directing and light diffusion.

In preferred embodiment, the surface feature of the invention comprises a prism. Prism structures are well known and efficiently increase the brightness of the transmitted light by rejecting light energy that is obliquely incident to the surface. The addition of the minute layered materials to prism surface features provide both increased brightness and haze allowing for the reduction of morie patterns created by the linear orientation of the prisms.

In another preferred embodiment, the surface feature of the invention comprises a corner cube. Corner cube surface features are well known and reduce glare of unwanted ambient light. The addition of the minute layered materials to corner cube features has been shown to further reduce the glare and increase the hardness of the corner cubes thus reducing increasing scratch resistance.

In another preferred embodiment of the invention, the surface feature comprises a linear array of curved surfaces. Curved surfaces are known to focus and change the direction of transmitted light. The addition of the minute layered materials to linear arrays of curved surfaces increases the hardness of the curved surfaces and provides light diffusing allowing the linear array to focus diffuse light.

In another preferred embodiment of the invention surface feature comprises complex lenses. Complex lenses are lens structures that have multiple curved random surfaces and have been shown to be very efficient light diffusers. The addition of the minute layered materials to the complex lenses increases the lens hardness, temperature resistance to temperatures encountered interior automobiles during the summer months and haze. The addition of the minute layered materials to the complex lenses has also been shown to further increase the spread of the light allowing the invention materials to efficiently diffuse transmitted light for wide angle viewing conditions such as LCD television.

Preferably, the complex lenses have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

In another preferred embodiment of the invention, the surface feature comprises a micro lens with at least one curved and one flat surface. The micro lens with at least one curved and one flat surface has been shown to efficiently increase the brightness of the transmitted light by rejecting light energy that is obliquely incident to the surface. The addition of the minute layered materials to lens features provide both increased brightness and haze allowing for the reduction of Moire patterns.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passing through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by-the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of e.g. a metallic film to the lenslet diffuser film of the present invention can be used e.g. as a retroreflective member for a traffic sign. It can be used in a state applied to a car, a bicycle, person, for example.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

FIG. 1 a schematic of an opticaal element 1 with layered particulates 7 are located in a layer containing microvoids 5. The optical element 1 contains a polymeric binder 3, microvoids 5 and layered particulate 7. The microvoids 5 contain organic microspheres 9.

Figure 2:
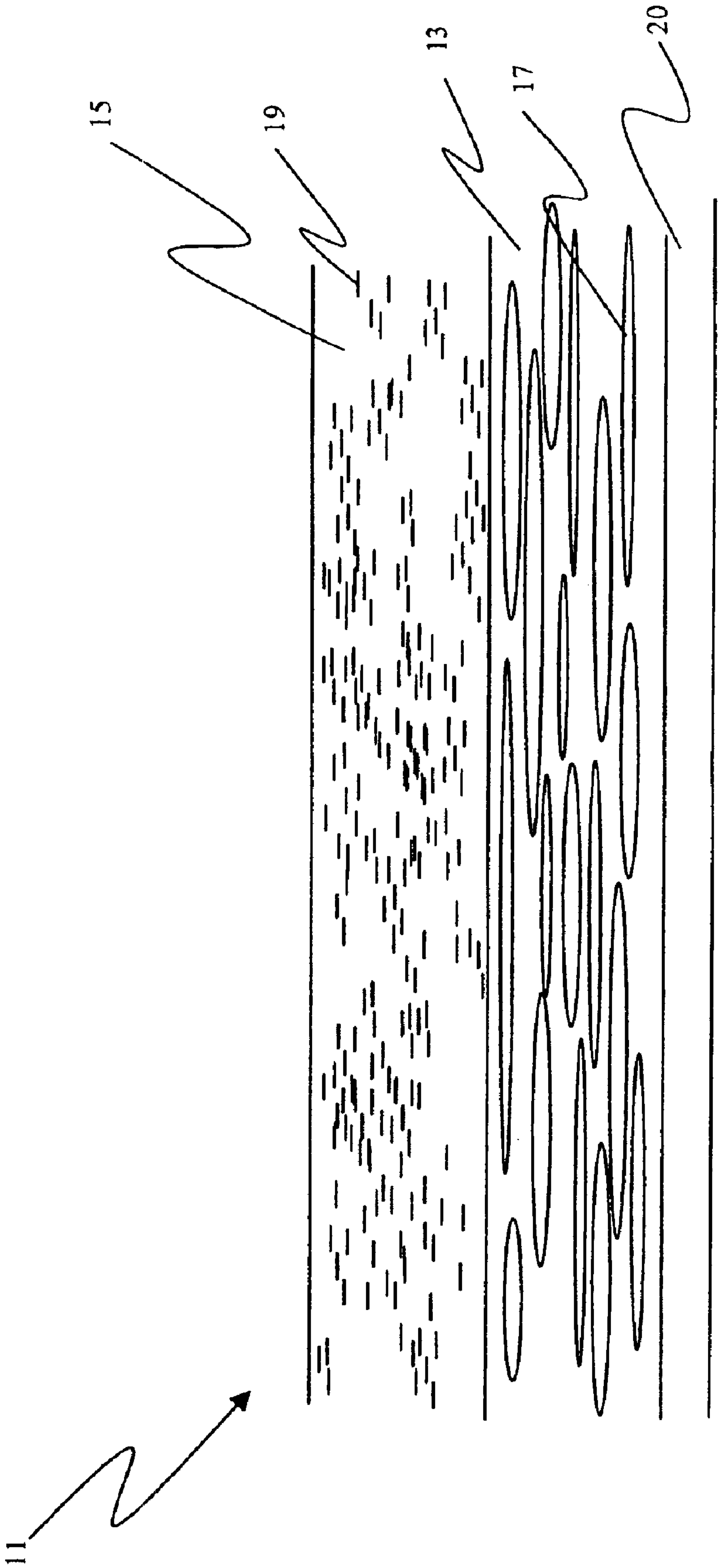
FIG. 2 is a schematic of an optical element where layered particulates are located in a layer adjacent to the microvoided layer.

FIG. 2 is a schematic of an optical element 11 containing two layers, a microvoided layer 13 and a layered particulate containing layer 15. The microvoided layer 13 contains microvoids 17. The layered particulate containing layer 15, located adjacent to the microvoided layer 13 contains Layered particulate 19. Located adjacent the microvoided layer 13, on the side opposite to the layered particulate layer 15, is a skin layer 20.

Figure 3:
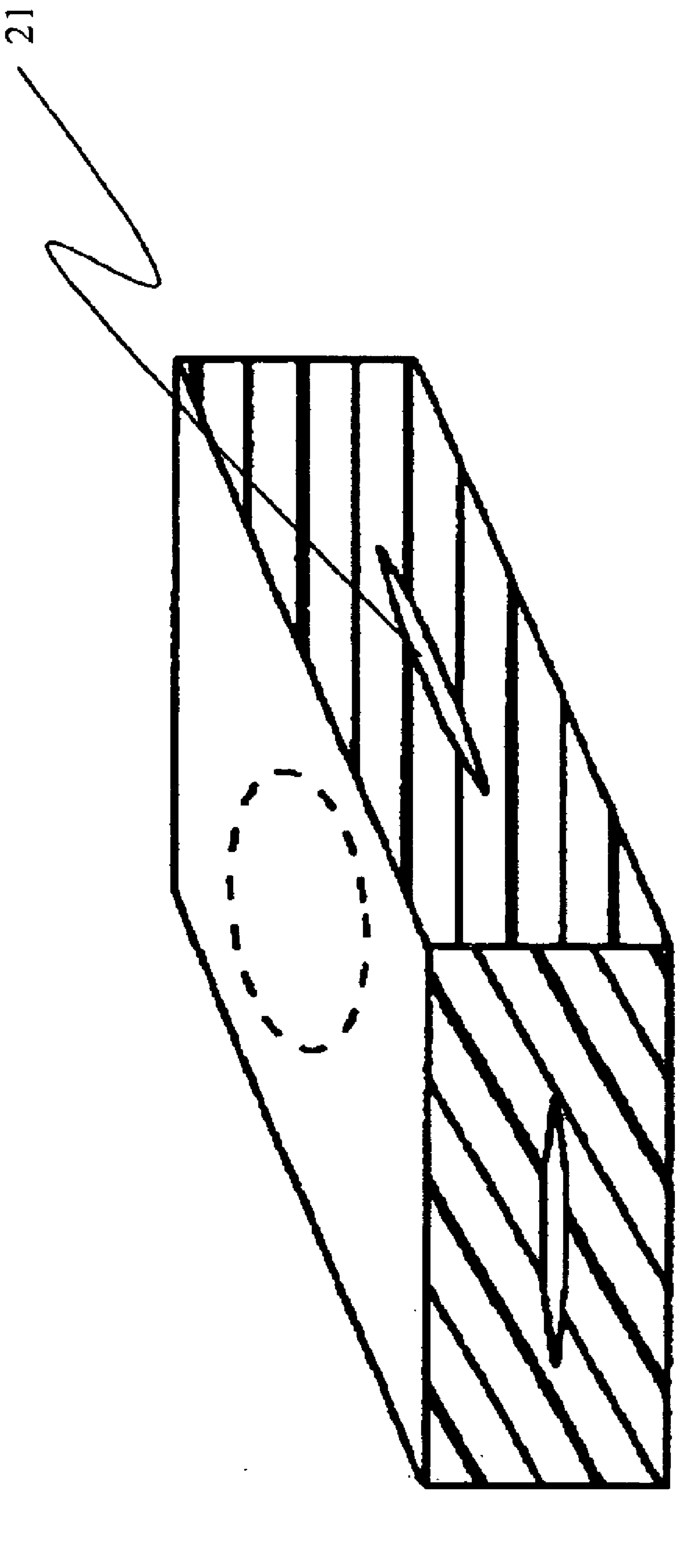
FIG. 3 is a schematic drawing illustrating a microvoid that is substantially circular in the cross section of the plane of the film.

FIG. 3 is a schematic drawing illustrating a microvoid that is substantially circular in the cross section of the plane of the film. The microvoid 21 is substantially circular in the cross section of the plane of the film.

Figure 4:
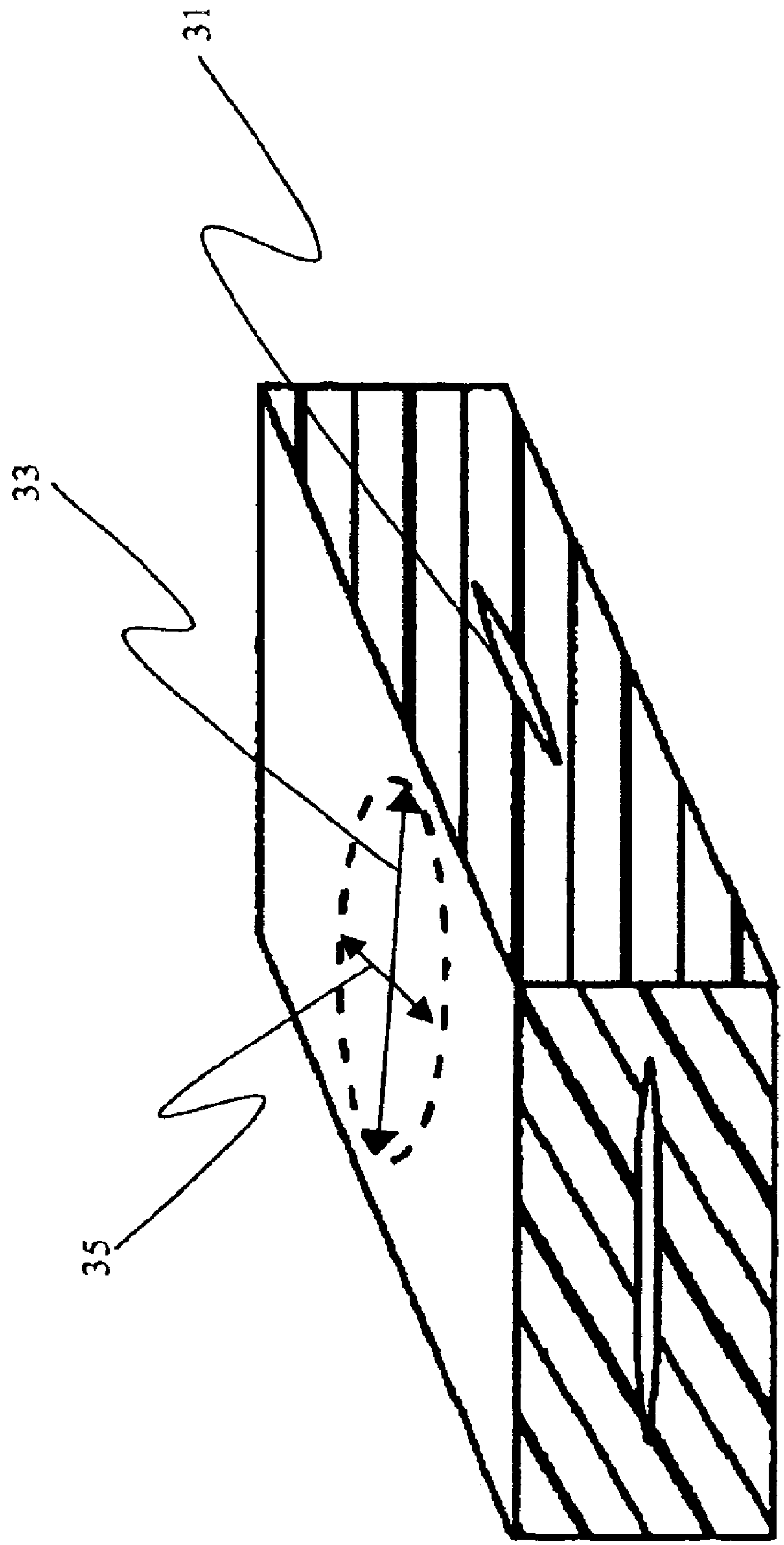
FIG. 4 is a schematic drawing illustrating a microvoid that has a major axis diameter to minor axis diameter.

FIG. 4 is a schematic drawing a microvoid that has a major axis diameter to minor axis diameter. Microvoid 31 has a major axis diameter 33 and a minor axis diameter 35.

Figure 5:
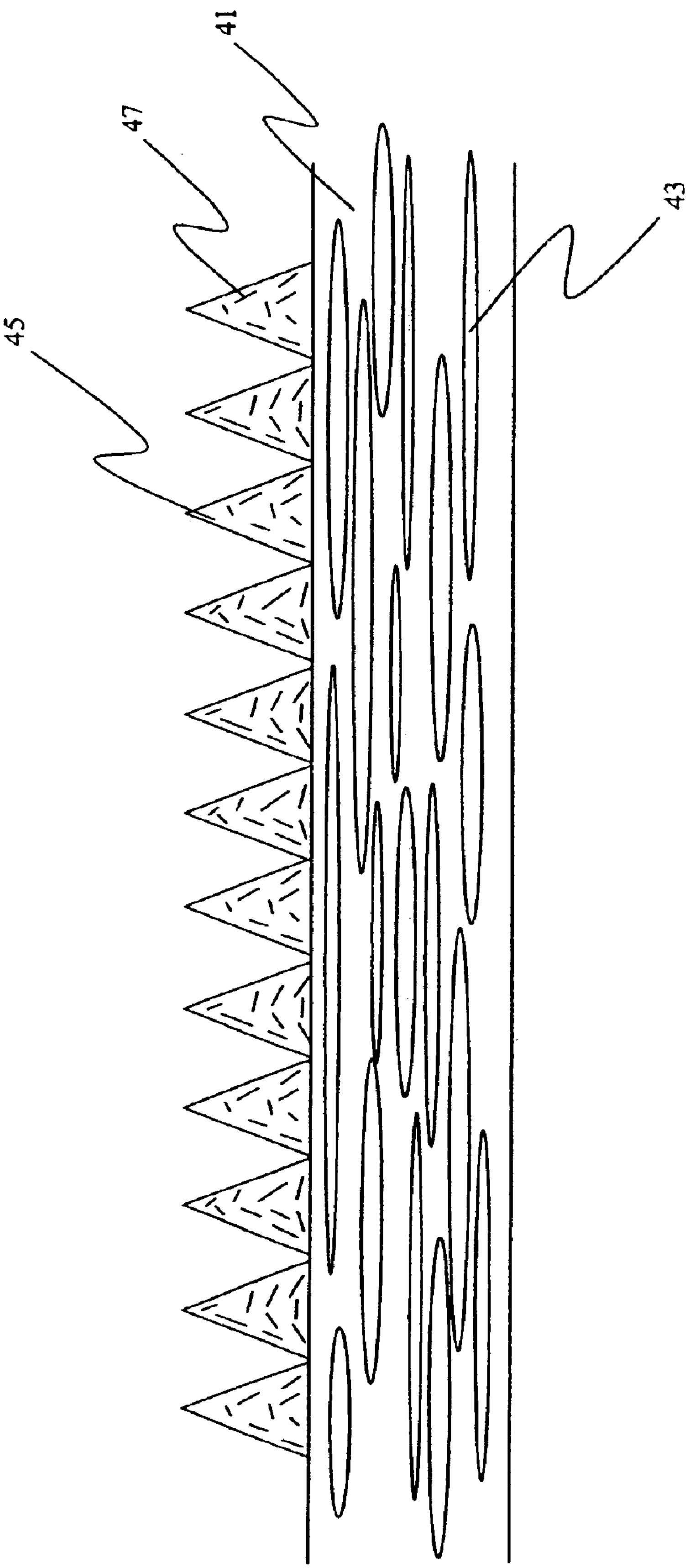
FIG. 5 is a schematic drawing of a microvoided layer and a prism structure containing layered particulate adjacent the microvoided layer.

FIG. 5 is a schematic drawing of a microvoided layer and a prism structure containing layered particulate adjacent the microvoided layer. The microvoided layer 41 contains microvoids 43. The prism structure containing layered particulate 45 is adjacent the microvoided layer 41. The prism structure containing layered particulate 45 contains layered particulate 47.

Figure 6:
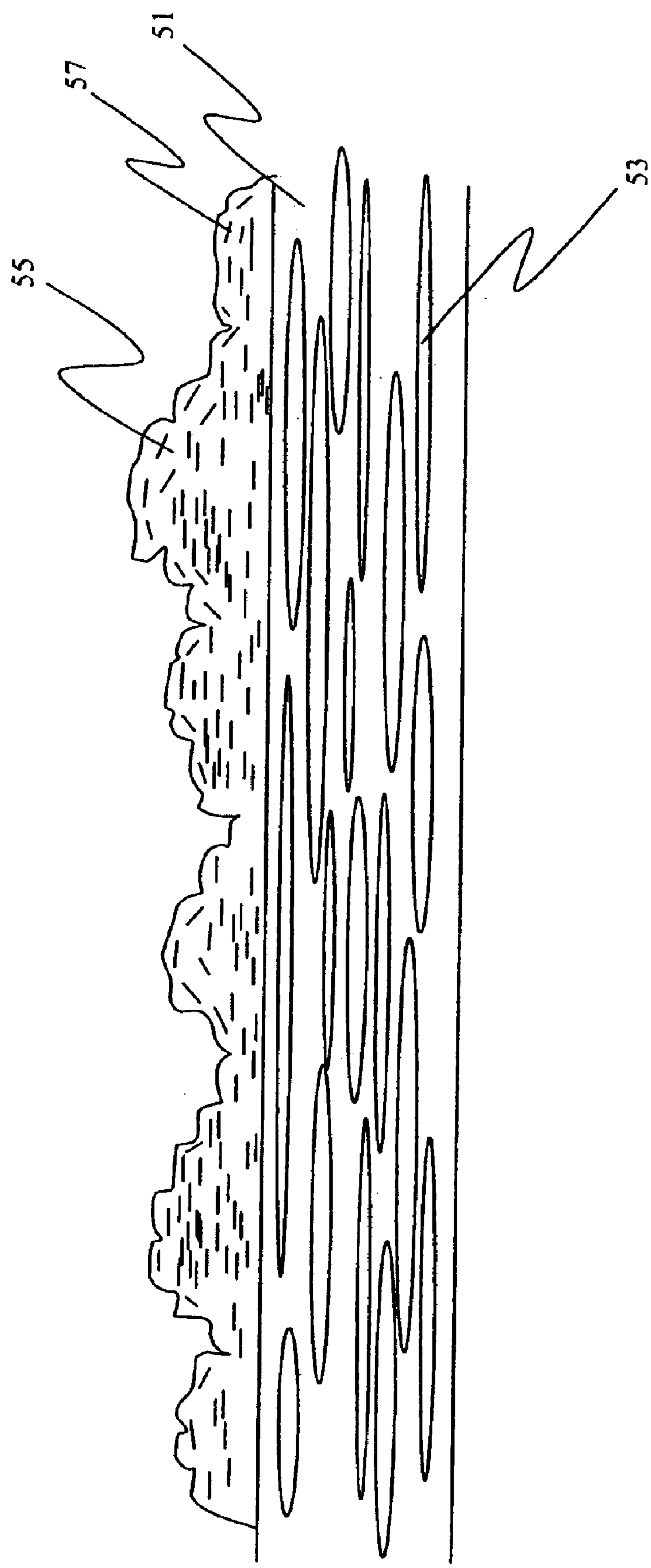
FIG. 6 is a schematic drawing of microvoided layer and a complex lens structure containing layered particulate adjacent the microvoided layer.

FIG. 6 is a schematic drawing of a microvoided layer and a complex lens structure containing layered particulate adjacent the microvoided layer. The microvoided layer 51 contains microvoids 53. The complex lens structure containing layered particulate 55 is adjacent the microvoided layer 51. The complex lens structure containing layered particulate 55 contains layered particulate 57.

Figure 7:
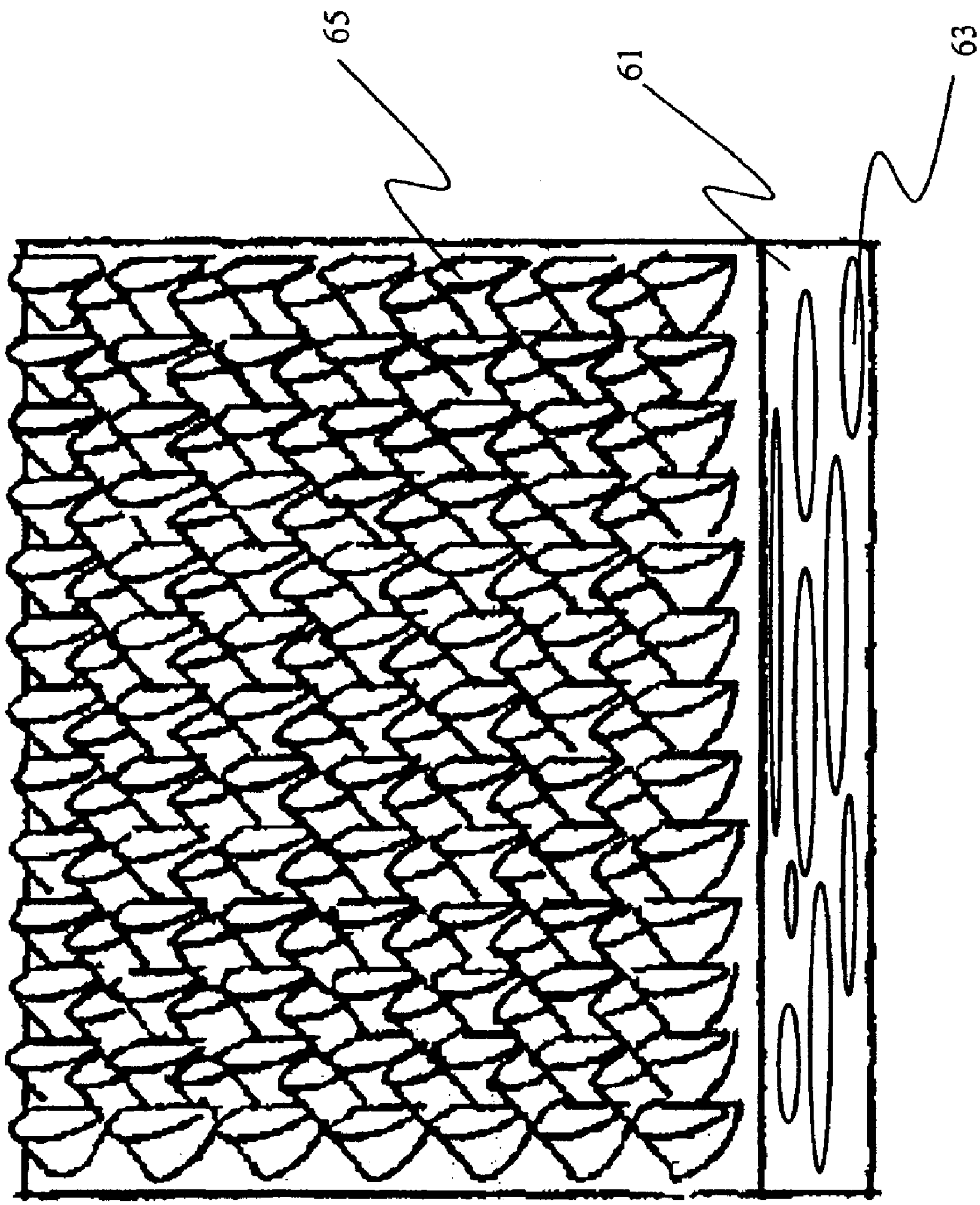
FIG. 7 is a schematic drawing of a microvoided layer and a layer of micro lenses with one curved and one flat surface containing layered particulate adjacent the microvoided layer.

FIG. 7 is a schematic drawing of a top down view of a microvoided layer and a layer of micro lenses with one curved and one flat surface containing layered particulate adjacent the microvoided layer. The microvoided layer 61 contains microvoids 63. The layer of micro lenses with one curved and one flat surface containing layered particulate 65 is adjacent the microvoided layer 61. The layer of micro lenses with one curved and one flat surface containing layered particulate 65 contains layered particulate, though the layered particulate can not be seen in the drawing because FIG. 7 is a top down view of the embodiment.

EXAMPLES

In this example, the optical element of the invention utilized co-extrusion to create a clay-containing and microvoided light diffuser suitable for diffusion of fluorescent backlighting sources typical for LCD. This diffuser was compared to single diffusion films of the same composition being either clay-containing or microvoided. This example will show that the co-extrusion of clay and microvoided polymer is advantaged to a monolayer of diffusion material, clay-containing or microvoided because it unexpectedly had higher transmission and haze than the two single films tested together. Further, it will be obvious that the diffuser film will be low in cost and have mechanical properties that allow for use in display systems.

For this example, the light diffusing films (both invention and control materials) were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. All spectra were acquired between 350 and 800 nm. As the results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The term "haze" means the ratio of % diffuse transmitted light to % total transmitted light multiplied by a factor of 100.

Prior to the film co-extrusion process, all of the polyester resins and compounded pellets were dried separately in desiccated dryers at 150° C. for 12 hours. For extrusion, the melt streams at 275° C. were fed into a 17.8 centimeter multi-manifold die also heated at 275° C. As each extruded sheet emerged from the die, it was cast onto a quenching roll set at 60–70° C.

Comparison—Extruded Clay-Containing Layer

A diffusion film containing clay was manufactured by a single layer extrusion process. The clay was first compounded by extruding through a strand die, cooling in a water bath, and pelletizing to create the clay-containing pellets. The composition of the clay-containing pellet was PET 7352 (a crystalline polyester supplied by Eastman Chemical Company) with 4% by weight Cloisite Na (natural montmorillonite clay from Southern Clay Products) intercalated with Pebax (polyether-block co-polyamide polymer supplied by Atofina). The CloisiteNa: Pebax wt. ratio in the pellet was kept at 70:30. A cast sheet was formed approximately 250 micrometers thick by extruding a 1:1 mixture of the clay composite (PET, Cloisite Na, and Pebax) and PETG (a fully amorphous grade of polyester, supplied by Eastman Chemical Company).

The cast sheet was cut into 13 cm×13 cm squares and then stretched simultaneously and symmetrically in the X and Y-directions using a standard laboratory to approximately 3 times the original sheet dimensions. The sheet temperature during stretching was 103° C.

Comparison—Extruded Microvoided Film

A diffusion film comprising a layer of clear polyester and a microvoided layer was manufactured by a co-extrusion process. The first layer, was composed of PET 7352 with an intrinsic viscosity of 0.74. This layer was extruded approximately 248 μm in thickness. This clear polyester layer did not impact the optical performance of the diffuser film, it was added for dimensional stability and processability of the diffuser film.

The second layer, was composed of PET 9921 (commercially available from Eastman Chemical Company as Eastapak #9921) impregnated with polystyrene beads to cause voiding. A 27 mm twin screw compounding extruder heated to 275° C. was used to mix polystyrene beads cross-linked with divinylbenzene with PET 9921. The void initiating beads had an average particle diameter of 2 μm. The beads were added to attain a 20% by weight loading in the polyester 9921 matrix. The components were metered into the compounder and one pass was sufficient for dispersion of the beads into the polyester matrix. The compounded material was extruded through a strand die, cooled in a water bath, and pelletized. The intrinsic viscosity of the PET 9921 resin with polystyrene beads was 0.80. This layer was approximately 25 μm in thickness.

The cast sheet was cut into 13 cm×13 cm squares and then stretched simultaneously and symmetrically in the X and Y-directions using a standard laboratory to approximately 3 times the original sheet dimensions. The sheet temperature during stretching was 103° C.

Co-Extruded Clay-Containing Layer and Microvoided Layer

A diffuser film composed of clay-containing layer and a microvoided layer was manufactured by a co-extrusion process. The clay used in the first layer was first compounded by extruding through a strand die, cooling in a water bath, and palletizing to create the nano-clay pellets. The composition of the clay-containing pellet was PET with 4% by weight Cloisite Na intercalated with Pebax, with Cloisite:Pebax ratio of 70:30. Minute layered particulate. Na Cloisite clayis a natural montmorillonite, supplied by Southern Clay Products. The particles have a minute dimension or layer thickness numerical average of 1–5 nm and an average basal plane spacing in the range of 1–5 nm.

Polyester Binder:

A blend of two types of polyester resins were used as a binder for dispersion of minute layered particulates. This clay-containing first layer was formed approximately 250 micrometers thick by extruding a 1:1 mixture of the clay composite (PET, Cloisite Na, and Pebax) and PETG.

The microvoided second layer, was composed of PET 9921 impregnated with polystyrene beads. A 27 mm twin screw compounding extruder heated to 275° C. was used to mix polystyrene beads cross-linked with divinylbenzene with PET 9921. The void initiating beads had an average particle diameter of 2 μm. The beads were added to attain a 20% by weight loading in the polyester 9921 matrix. The components were metered into the compounder and one pass was sufficient for dispersion of the beads into the polyester matrix. The compounded material was extruded through a strand die, cooled in a water bath, and palletized. The intrinsic viscosity of the polyester 9921 resin with polystyrene beads was 0.80. The second microvoided layer was cast approximately 25 μm in thickness.

This example used co-extrusion to create two layers, one containing clay and one of microvoided polymer, but the clay and microvoided polymer could have been extruded together in one layer. Furthermore, more than one microvoided polymer layer or clay-containing layer could have been used to create different optical properties. The structure of the co-extruded clay-containing and microvoided diffuser before stretching was as follows:

| |
|---|
| 250 micrometer polyester with 4% nano-clay layer |
| 25 micrometer polyester microvoided layer |

The cast sheet was cut into 13 cm×13 cm squares and then stretched simultaneously and symmetrically in the X and Y-directions using a standard laboratory to approximately 3 times the original sheet dimensions. The sheet temperature during stretching was 103° C. The processing conditions are shown in Table 1.

TABLE 1

| | Clay-containing Diffuser | Microvoided Diffuser | Clay-containing and Microvoided Diffuser |
|---|---|---|---|
| Clay-containing layer thickness after stretching (micrometers) | 28.2 | N/A | 27.5 |
| Microvoided layer thickness after stretching (micrometers) | N/A | 3.0 | 2.7 |
| Clear PET layer thickness after stretching (micrometers) | N/A | 26.7 | N/A |
| % Total Transmission | 85.6 | 84.4 | 83.9 |
| % Haze | 62.6 | 41.3 | 82.2 |

As the data above clearly indicates, clay-containing and microvoided polymer diffusers provided much higher haze and total transmission than either the clay-containing diffuser or microvoided diffuser. In an unexpected result, the combination of the microvoided layer and the clay-containing layer diffuser performs better than the two single films together. The result of combining the clay-containing diffuser and the microvoided diffuser is 72.2% total transmission and 77.6% haze. The light passed through the clay-containing diffuser first, then the microvoided diffuser. The microvoided film transmitted 84.4% of the transmitted light passed through the clay-containing diffuser (85.6%). The microvoided diffuser diffused 41.3 percent of the light that passed through the clay-containing diffuser. The actual co-extruded clay-containing and microvoided diffuser had 83.9% total transmission and 82.2% haze, higher than the two separate films tested together (72.2% total transmission and 77.6% haze). The total transmission and haze were larger than the separate films tested together, leading to more efficient diffusing for the backlight of a LCD display and a brighter display. A brighter LC device has significant commercial value in that a brighter image allows for a reduction in battery power and better allows the LC device to be used in demanding outdoor sunlight conditions.

Further, because the example materials were constructed from oriented polyester with particulate layered materials, the materials have a higher elastic modulus compared to cast diffuser sheets. Because the example materials were oriented, the impact resistance was also improved compared to cast diffuser sheets making the example materials more scratch resistant. Finally, the oriented polymer diffuser layers of the example allow for the voided layer to be thin and therefore cost efficient as the materials content of the example materials is reduced compared to prior art materials.

Further, because the invention materials contained layered materials, the materials have a higher (14%) elastic modulus compared to complex lenses without the layered materials. The light diffusion surface features, since they contained layered materials, had an increase in Tg of 9.1 degrees C. compared to the polyester light diffusion lenses without the layered materials allowing the invention materials to be more thermally stable at high temperatures such as those encountered in an automobile interior during the summer months or a battle field LCD display in a tank.

While this example was primarily directed toward the use of thermoplastic light diffusion materials for LC devices, the materials useful in the invention have value in other diffusion applications such as back light display, imaging elements containing a diffusion layer, a diffuser for specular home lighting and privacy screens, image capture diffusion lenses and greenhouse light diffusion. Further, the improvements in mechanical properties, and the increase in Tg of the sheet, the materials useful in the invention also have value as labels films, imaging supports, synthetic paper and decorative packaging materials.

The entire contents of the patents and other publications referred to in this specification are incorporated herein by reference.

| Parts Lists | |
|---|---|
| 1 | Optical element |
| 3 | Polymeric Binder |
| 5 | Microvoid |
| 7 | Layered particulate |
| 9 | Organic Microsphere |
| 11 | Optical element |
| 13 | Microvoided layer |
| 15 | Layered particulate containing layer |
| 17 | Microvoid |
| 19 | Layered particulate |
| 20 | Skin layer |
| 21 | Microvoid |
| 31 | Microvoid |
| 33 | Major axis diameter |
| 35 | Minor axis diameter |
| 41 | Microvoided layer |
| 43 | Microvoid |
| 45 | Prism structure containing layered particulate |
| 47 | Layered particulate |
| 51 | Microvoided layer |
| 53 | Microvoid |
| 55 | Complex lens structure containing layered particulate |
| 57 | Layered particulate |
| 61 | Microvoided layer |
| 63 | Microvoid |
| 65 | Layer of micro lenses with one curved and one flat surface containing layered particulate |

What is claimed is:

1. An optical element comprising a polymer film containing a dispersion of minute layered particulates in a polymeric binder and microvoids, wherein the polymer film comprises a polyester.

2. The optical element of claim 1 wherein the light transmission is greater than 50%.

3. The optical element of claim 1 wherein the haze is at least 80%.

4. The optical element of claim 1 wherein the elastic modulus of the film is greater than 800 MPa.

5. The optical element of claim 1 wherein the difference in refractive index between the polymeric binder and the microvoids is greater than 0.2.

6. The optical element of claim 1 wherein the microvoids contain organic microspheres.

7. The optical element of claim 1 wherein the microvoids are substantially free of light scattering inorganic particles.

8. The optical element of claim 1 wherein the microvoids contain a gas.

9. The optical element of claim 1 wherein the microvoids are substantially circular in the cross section of the plane of the film.

10. The optical element of claim 1 wherein the microvoids have a major axis diameter to minor axis diameter ratio of less than 2.0.

11. The optical element of claim 1 wherein said microvoids have a major axis diameter to minor axis diameter ratio of between 1.6 and 1.0.

12. The optical element of claim 1 wherein said film contains, on average, greater than 4 index of refraction changes greater than 0.20 parallel to the direction of light travel.

13. The optical element of claim 1 wherein said microvoids have an average volume of between 8 and 42 cubic micrometers over an area of 1 $cm^2$.

14. The optical element of claim 1 wherein said layered particulates are located in a layer containing microvoids.

15. The optical element of claim 1 wherein said layered particulates are located in a layer adjacent to a microvoided layer.

16. The optical element of claim 1 wherein the optical element further comprises a polymer skin layer.

17. The optical element of claim 1 wherein said optical element further comprises surface optical features with a Ra greater than 5 micrometers.

18. The optical element of claim 1 wherein said layered particulates have an aspect ratio between 10:1 and 1000:1.

19. The optical element of claim 1 wherein said layered particulates have an aspect ratio between 10:1 and 250:1.

20. The optical element of claim 1 wherein the layered particulates are present in an amount between 1 and 10% by weight of said polymeric binder.

21. The optical element of claim 1 wherein said layered particulates comprise layered double hydroxide.

22. The optical element of claim 1 wherein said layered particulates comprise intercalated smectite clay.

23. The optical element of claim 22 wherein said intercalated clay comprises oxylated alcohol intercalated clay.

24. The optical element of claim 22 wherein said oxylated alcohol comprises ethoxylated alcohol.

25. The optical element of claim 22 wherein said ethoxylated alcohol has a hydrocarbon chain length of between 12 and 106 carbons.

26. The optical element of claim 22 wherein said ethoxylated alcohol has a hydrocarbon chain length of between 26–50 carbons.

27. The optical element of claim 22 wherein said ethoxylated alcohol intercalated in smectite clay is dispersed in polyolefin polymer.

28. The optical element of claim 22 wherein said ethoxylated alcohol intercalated in smectite clay is dispersed in polyolefin polymer and at least one layer of polymer not containing intercalated smectite are integrally connected during simultaneous extrusion.

29. The optical element of claim 22 wherein said intercalated smectite clay comprises block copolymer intercalated in smectite clay.

30. The optical element of claim 29 wherein the block copolymer comprises a hydrophilic block that intercalates clay.

31. The optical element of claim 30 wherein said hydrophilic block comprises at least one member selected from the group consisting of poly(alkylene oxide), poly 6,(2-ethyloxazolines), poly(ethylenemine), poly (vinylpyrrolidone), poly (vinyl alcohol), polyacrylamides, polyacrylonitrile, polysaccharides, and dextrans.

32. The optical element of claim 30 wherein said hydrophilic block comprises polysaccharide.

33. The optical element of claim 30 wherein said hydrophilic block comprises polyvinyl pyrrolidone.

34. The optical element of claim 29 wherein the block copolymer comprises an oleophilic block.

35. The optical element of claim 34 wherein said oleophilic block comprises at least one member selected from the group consisting of polycaprolactone, polypropiolactone, poly β-butyrolactone; poly δ-valerolactone; poly ε-caprolactam; polylactic acid; polyglycolic acid; polyhydroxybutyric acid; derivatives of polyglysine; and derivatives of polyglutamic acid, polymers of α, β-ethylenically unsaturated monomers.

36. The optical element of claim 1 wherein said layered particulates is synthetic clay.

37. The optical element of claim 1 wherein said layered particulates is organically modified.

38. The optical element of claim 1 wherein said polymer film comprises at least one layer of polyester.

39. The optical element of claim 1 wherein said polymer film comprises at least one layer of polyolefin.

40. The optical element of claim 1 wherein the difference in refractive index between layered particulates and polymeric binder is greater than 0.08.

41. The optical element of claim 1 wherein the layered particulates are present in an amount between 0.1 and 1% by weight of said binder.

42. The optical element of claim 1 wherein the optical element comprises two or more layers.

43. The optical component of claim 1 wherein the minute layered particulates have a lateral dimension of 0.01 to 5 $\mu$m and a thickness of 0.5 to 10 nm.

44. The optical component of claim 1 wherein the minute layered particulates have a basal plane spacing of from 1 to 9 nm.

45. An optical element comprising a polymer film containing a dispersion of minutes layered particulates in a polymeric binder and microvoids wherein the microvoids contained crosslinked polymer beads.

46. The optical element of claim 11 wherein the crosslinked polymer beads have a mean particle size less than 2.0 micrometers.

47. The optical element of claim 45 wherein the haze is at least 80%.

48. An optical element comprising a polymer film containing a dispersion of minute layered particulates in a polymeric binder and microvoids wherein said layered particulates comprise smectite clay.

49. The optical element of claim 48 wherein the polymer film comprises a polycarbonate.

50. The optical element of claim 48 wherein the polymer film comprises polyolefin repeating unit.

51. An optical element comprising a polymer film containing a dispersion of minute layered particulates in a polymeric binder and microvoids wherein said layered particulates comprise intercalated smectite day that comprises block copolymer intercalated in the smectite clay in which the block copolymer comprises a hydrophilic block that intercalates day wherein said hydrophilic block comprises poly(ethylene oxide).

* * * * *

UNITED STATES PATENT AND TRADEMARK OFFICE
CERTIFICATE OF CORRECTION

PATENT NO. : 6,958,860 B2
DATED : October 25, 2005
INVENTOR(S) : Narasimharao Dontula et al.

It is certified that error appears in the above-identified patent and that said Letters Patent is hereby corrected as shown below:

Column 38,
Line 35, insert -- 45 -- in place of “11”.

Signed and Sealed this

Third Day of January, 2006

JON W. DUDAS
*Director of the United States Patent and Trademark Office*